United States Patent
Domova (10) Patent No.: US 11,862,006 B2
(45) Date of Patent: Jan. 2, 2024

(54) VISUAL OPERATOR INTERFACE FOR A TECHNICAL SYSTEM

(71) Applicant: ABB Schweiz AG, Baden (CH)

(72) Inventor: Veronika Domova, Västerås (SE)

(73) Assignee: ABB Schweiz AG, Baden (CH)

( * ) Notice: Subject to any disclaimer, the term of this patent is extended or adjusted under 35 U.S.C. 154(b) by 182 days.

(21) Appl. No.: 17/400,566

(22) Filed: Aug. 12, 2021

(65) Prior Publication Data

US 2022/0084392 A1     Mar. 17, 2022

(30) Foreign Application Priority Data

Sep. 11, 2020 (EP) ...................................... 20195675

(51) Int. Cl.
  *G08B 29/10* (2006.01)
  *G06F 3/01* (2006.01)
  *H04N 7/18* (2006.01)

(52) U.S. Cl.
  CPC .............. *G08B 29/10* (2013.01); *G06F 3/013* (2013.01); *H04N 7/181* (2013.01)

(58) Field of Classification Search
  CPC ................ H04N 7/181; G05B 23/0272; G06F 3/04845; G06F 3/0481; G06F 3/048; G06F 3/1454
  See application file for complete search history.

(56) References Cited

U.S. PATENT DOCUMENTS

| | | | | |
|---|---|---|---|---|
| 5,969,697 | A * | 10/1999 | Tani | G06F 3/04812 345/2.1 |
| 2014/0173530 | A1* | 6/2014 | Mesguich Havilio | G06F 3/0482 715/863 |
| 2014/0293137 | A1* | 10/2014 | Braunstein | H04N 7/181 348/734 |
| 2016/0334784 | A1* | 11/2016 | Takahashi | G06F 3/0488 |
| 2018/0011533 | A9* | 1/2018 | Marggraff | H04N 23/80 |

FOREIGN PATENT DOCUMENTS

| | | |
|---|---|---|
| EP | 2189865 A1 | 5/2010 |
| WO | 2020156636 A1 | 8/2020 |

OTHER PUBLICATIONS

Kahneman, Daniel; "Attention and Effort"; Prentice Hall, Inc. (series in experimental psychology); Englewood Cliffs, NJ; Jan. 1, 1973; 253 Pages.

Renner, Patrick, et al; "Attention Guiding Techniques using Peripheral Vision and Eye Tracking for Feedback in Augmented-Reality-based Assistance Systems"; 2017 IEEE Symposium on 3D User Interfaces (3DUI); Los Angeles, CA; Mar. 18, 2017; 9 Pages.

(Continued)

*Primary Examiner* — Mirza F Alam
(74) *Attorney, Agent, or Firm* — Whitmyer IP Group LLC (57) ABSTRACT

A method of controlling a visual operator interface having a plurality of predefined areas, which include one or more monitoring areas configured to display visual elements representing a current state of a technical system. According to the method, it is determined that one of the monitoring areas is to be prioritized; and an incomplete visibility decrease in at least one other area of the visual operator interface is initiated, wherein the prioritized monitoring area is unaffected by the visibility decrease.

17 Claims, 4 Drawing Sheets

(56) References Cited

OTHER PUBLICATIONS

Renner, Patrick, et al.; "A Path-Based Attention Guiding Technique for Assembly Environments with Target Occlusions"; 2018 IEEE Conference on Virtual Reality and 3D User Interfaces (VR); Tuebingen/Reutlingen, Germany; Mar. 18, 2018; 2 Pages.

Zhou, Jiayang; "Guiding Operators' Attention with the Help of a Visual Aid System"; MSc Thesis in Informatics, University of Skövde, School of Informatics; Högskolevägen 1, Skövde, SE-541 28; Jun. 4, 2019; 37 Pages.

Extended European Search Report; Application No. 20195675.2; Completed: Feb. 3, 2021; dated Feb. 11, 2021; 8 Pages.

* cited by examiner

VISUAL OPERATOR INTERFACE FOR A TECHNICAL SYSTEM

TECHNICAL FIELD

The present disclosure relates to the field of visual operator interfaces for controlling or monitoring a technical system. In particular, it relates to a multi-screen interface.

BACKGROUND

It is not uncommon for industrial control stations to have as many as nine screens. A human person physically cannot look at all the screens at the same time. Instead, the operator is normally working with one or several screens which are in his/her focal (or central) visual field, i.e., in front of the eyes. Other screens are in the operator's peripheral visual field, i.e., the operator cannot properly see what is depicted on them. It is up to the operator to decide on which particular task and with which particular screen to work at a given moment in time, e.g., she can decide to read a manual on one screen while occasionally keeping an eye on some overview screen. Since there are many screens, there is a probability that while the operator is actively engaging with one screen, she is missing urgent information depicted on another screen that actually requires much more attention, e.g., an ongoing alarm or a suspicious activity.

In a conventional operator system, there is no guarantee that when an alarm comes, the operator immediately notices it and starts working with it. Often operators even switch off the sound notifications of alarms since too many alarms being triggered create a constant noise in the control room. With a high likelihood, this introduces a certain time delay that elapses before operators notice and start working on appearing alarms, or they may even miss some alarms altogether. In some cases, such a time delay is highly unwelcome, e.g., in case of severe emergency alarms when the operators must react immediately to prevent unwanted consequences. Attempts to reduce or eliminate such time delay are presented in J. Zhou, *Guiding operators' attention with the help of a visual aid system*, MSc thesis in Informatics, Högskolan i Skövde (2019).

Further research in the field includes the conference papers
P. Renner et al., "A Path-based Attention Guiding Technique for Assembly Environments with Target Occlusions", *IEEE Virtual Reality* 2018;
P. Renner et al., "Attention guiding techniques using peripheral vision and eye tracking for feedback in augmented-reality-based assistance systems", *IEEE Symposium on 3D User Interfaces (3DUI)* 2017.

In addition to reducing the reaction delay, it would furthermore be desirable to verify that the task on which an operator is currently working is the most urgent or relevant one; to incite the operator to change her focus of attention; and/or to prompt the operator to attend to urgent information that is being displayed in an out-of-focus area of a visual interface.

SUMMARY

One objective of the present invention is to make available a method for controlling a visual operator interface in a way that benefits operators' attention, in particular is likely to reduce the reaction time to a message or alarm appearing on an out-of-focus area of the interface. A further objective is to propose a visual operator interface with these characteristics. These and other objectives are achieved by the invention according to the independent claims.

A first aspect relates to a method of controlling a visual operator interface comprising a plurality of predefined areas. Among these, there are one or more monitoring areas, which are configured to display visual elements representing a current state of a technical system, such as running machinery, an industrial process or a large-scale computer system. The areas other than the monitoring areas may display different content, such as a messaging application, an Internet browser, an office application or non-professional content. In one embodiment, the method comprises determining that one of the monitoring areas is to be prioritized. If this is the case, an incomplete visibility decrease in at least one other area of the visual operator interface is initiated, wherein the prioritized monitoring area is unaffected by the visibility decrease. The determination that one of the monitoring areas is to be prioritized may be based on a change in the current state of the technical system, such as an event, failure, alarm and/or notification.

It is well known that humans, when actively engaged into an intellectual activity, may become effectively blind to the surrounding events. This mental state is often referenced to as 'the flow', which is hypothesized to appear in conditions of cognitive ease of a current activity, i.e., when the human can fluently process the information and easily interact with it while staying in a safe environment without any life-threats or disturbances. The inventor has realized that an operator can be nudged to leave the flow state, stop an ongoing activity and look for more urgent tasks if the cognitive load increases, i.e., when noticeably higher cognitive (or mental) effort is needed to carry on with the activity. The relationship between cognitive effort and attention to a task is discussed in D. Kahneman, *Attention and effort*, Prentice-Hall (1973), ISBN 9780130505187.

Preferably, the other area or areas of the visual operator interface is neither turned off nor concealed, just made harder to perceive. This is in the interest of a soft departure from the current task and/or of non-invasive or non-intrusive interaction. The inventor has hypothesized that stimuli that interfere abruptly with the operator's mental processes may introduce a recovery period, which must elapse before the operator is fully able to focus on the prioritized monitoring area.

In one embodiment, the visual operator interface comprises at least three predefined areas, so that it is not immediately evident to the operator which area is prioritized if the area of her current focus undergoes a visibility decrease. Valuable reaction time is gained, therefore, if the visibility decrease includes displaying, in at least one other area of the visual operator interface, a visual cue identifying the prioritized monitoring area or visual guidance towards the prioritized monitoring area. The visual cue may be a number, symbol or other label of the prioritized monitoring area. The visual guidance may include a stationary or animated shape representing the direction, distance etc. to the prioritized monitoring area. Furthermore, also the prioritized monitoring area may include a pointer, frame, highlighting or the like that guides the operator's gaze to the relevant information.

A further development of this embodiment is also applicable to handheld devices, such as personal digital assistants, tablets, smartphones, smartwatches. Then, if the not-prioritized area is displayed on a handheld device, the method further includes determining a location and/or orientation of said other area relative to the prioritized monitoring area; in general, this depends on the operator's hand position and orientation or the surface where the handheld device is resting. The visual guidance is generated to reflect to the determined geometric relationship; it may be updated while the visual guidance is being disclosed, to account for subsequent hand movements by the operator.

In one embodiment, the visibility decrease is gradual over time. Compared with a visibility decrease that is being applied instantaneously, the graduality may further a soft departure from the operator's current, not-prioritized task. The gradual visibility decrease may be implemented by gradually increasing, throughout the not-prioritized area, an intensity of a visibility-reducing effect. Alternatively, the visibility-reducing effect is applied at full intensity but limited to a gradually increasing sub-region of the not-prioritized area, e.g., beginning at edges of the area and extending inwardly.

In one embodiment, the visibility decrease is combined with the displaying of an overlay, such as a solid or semi-transparent graphical element which is different from the normal or expected signs of a failure of the visual operator interface, an error affecting the information transfer from the technical system to the interface or the like. The graphical element may be recognizable to the operator, e.g., from a manual or previously displayed views within the visual operator interface. Seeing the overlay, the operator is able to understand that the visibility decrease is intentional rather than an artefact of the visual operator interface that should be ignored or that should suggest debugging the interface itself.

In one embodiment, there is provided a computationally efficient implementation of the visibility decrease in a not-prioritized area of the interface which is showing a live stream of images. As used herein, the qualifier "live" refers to a continuous updating of the image, not necessarily that the image shows or represents real-time events. In this embodiment, rather than processing each image of the live stream or every $n^{th}$ image ($n \geq 2$) of the live stream, a snapshot of one image is processed and displayed in lieu of the live stream. This reduces the computational load at no detriment for the operator, since the visibility decrease will anyway render the not-prioritized area at least partially illegible. Apart from the efficiency gain, this embodiment is advantageous when the not-prioritized area displays screen images from an application unrelated to the technical system, namely, because it removes the need to control the other application, to which the operating interface (or system administrator) normally lacks access rights. The application unrelated to the technical system may be separate from a technical monitoring application which displays the state of the technical system; it may be a messaging application, an Internet browser, an office application or non-professional content.

Some further embodiments include locating an operator's attention in one or more of the predefined areas. The attention may be located by tracking the operator's gaze, bodily attitude or proximity to the various areas, or determining in what area those visual elements are located that were most recently actuated (on request or voluntarily). With knowledge of the operator's attention, the visibility decrease can be made conditional in such manner that it is executed only if the operator does not redirect her attention to the prioritized area voluntarily. For example, the visibility decrease can be initiated only if the operator's attention (as monitored) remains outside the prioritized monitoring area for a predetermined time period after a visual, haptic or audible notification. This criterion evaluates negative if the operator is focusing on the prioritized area already when the notification is emitted, and no action needs to be taken. In an implementation, the criterion may be evaluated in a simplified manner by locating the operator's attention right at expiry of the predetermined time period, thereby disregarding where the attention has been directed during the time period.

Another use of the knowledge of where the operator's attention is directed is that the visibility decrease can be undone when the monitored attention of the operator enters the prioritized monitoring area. Alternatively, it is undone when the monitored attention of the operator has remained in the prioritized monitoring area for a predetermined second time period.

A second aspect relates to an industrial operator terminal having at least one visual display, a communication interface for receiving information relating to a current state of a technical system, and processing circuitry configured to generate a visual operator interface with the above characteristics.

The invention further relates to a computer program containing instructions for causing a computer, or the operator terminal in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storages of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless this is explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. The invention may, however, be embodied in many different forms and the embodiments should not be construed as limiting; rather, they are provided by way of example so that this disclosure will be thorough and complete, and to fully convey the scope of all aspects of the invention to those skilled in the art. Like numbers refer to like elements throughout the description.

Figure 1:
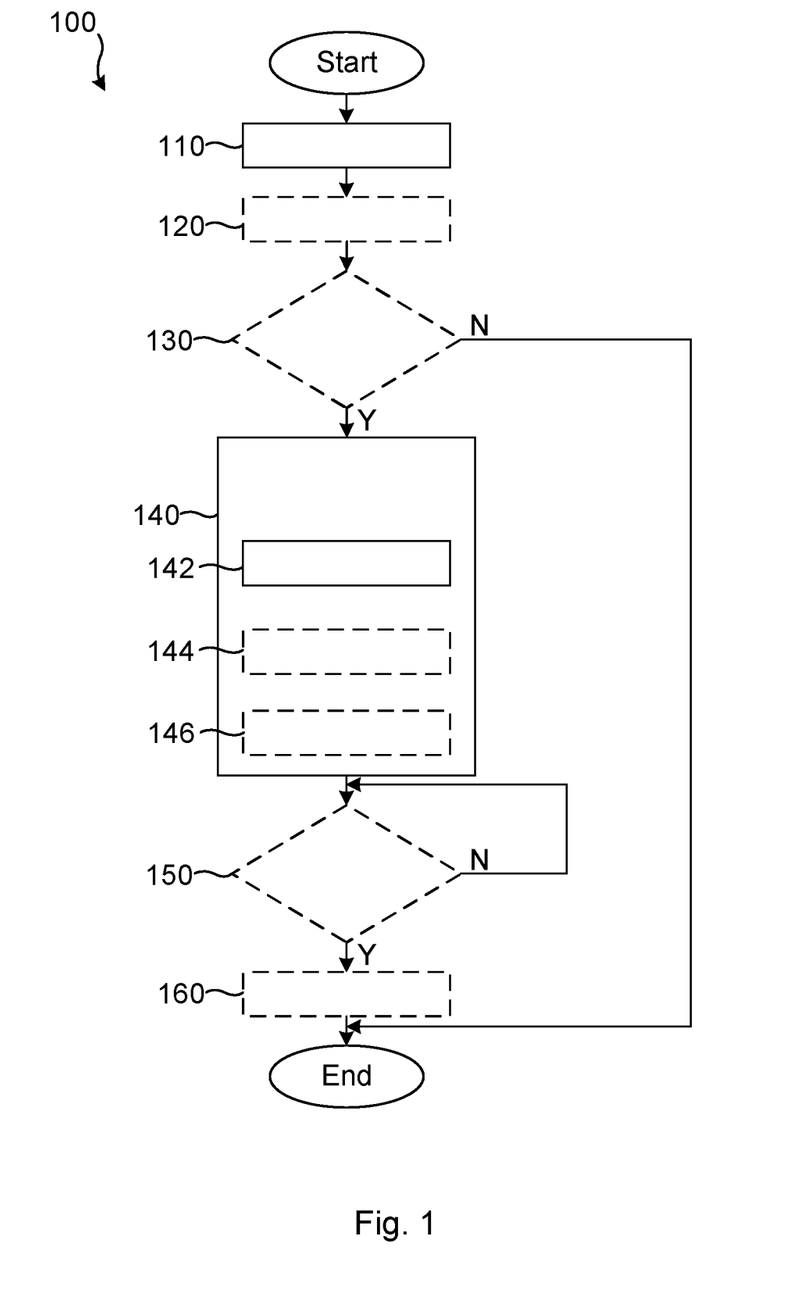
FIG. 1 is a flowchart showing basic and optional steps of a method according to an embodiment of the invention.

FIG. 1 is a flowchart of a method 100 of controlling visual operator interface. Such a visual operator interface may be generated by an industrial operator terminal, generally comprising at least one visual display 220 (cf. FIGS. 2-4), a communication interface for receiving information relating to a current state of a technical system 290 (cf. FIGS. 2-4) and processing circuitry. The visual operator interface may include a plurality of predefined areas 210 (cf. FIGS. 2-4 and 8), which include one or more monitoring areas configured to display visual elements representing a current state of the technical system 290.

Figure 2:
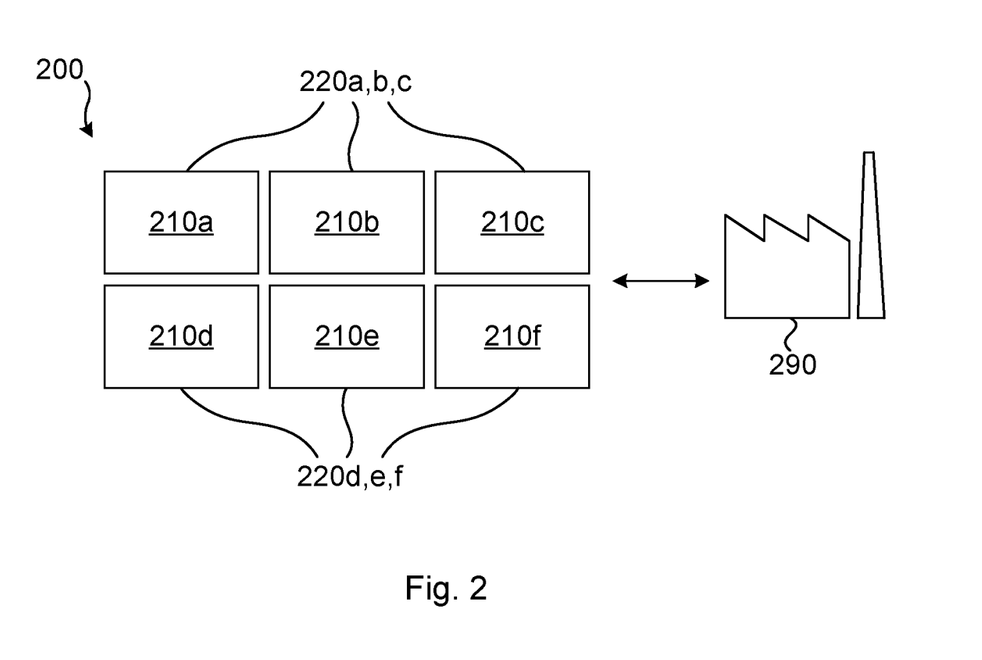
FIGS. 2, 3 and 4 shows examples of physical means for generating the areas of the visual operator interface.

As FIG. 2 illustrates, the predefined areas 210 are in a one-to-one relationship with physical devices, e.g., there are provided visual displays 220, each of which generates one area 210 of the visual operator interface. The visual displays 200 may be juxtaposed, as shown in the FIG. 2. When looked at from an operator position at comfortable viewing distance, at least the outermost areas 210a, 210c, 210d, 210f will normally extend into the operator's peripheral visual field. When multiple visual displays 220 are employed, each may be supplied with an independent pixel-value signal proper to that visual display 220.

Figure 3:
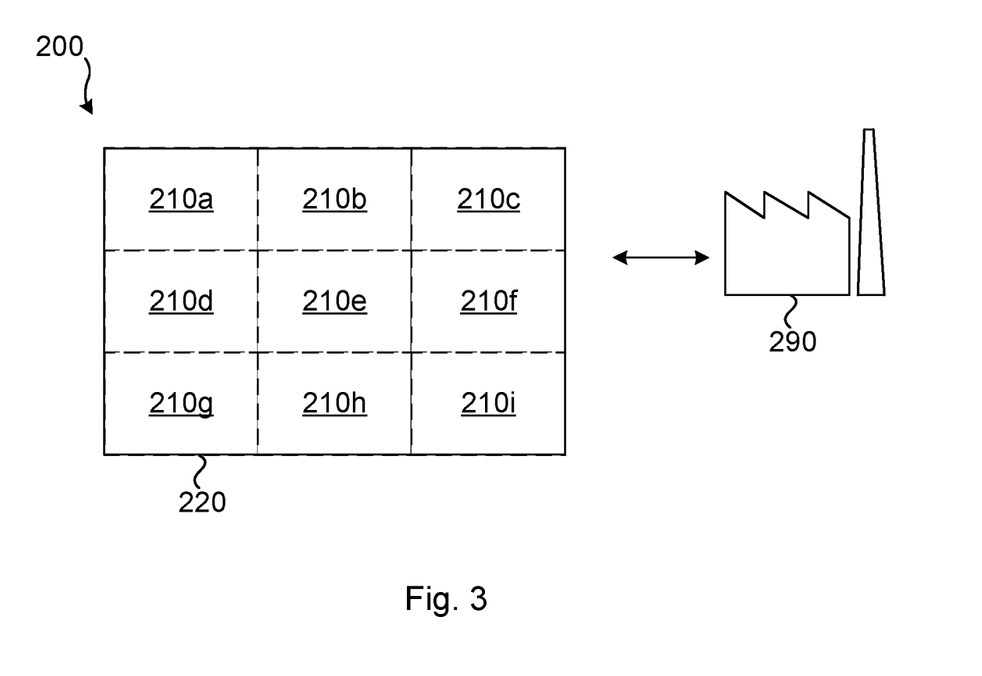

Alternatively, as FIG. 3 shows, the predefined areas 210 may occupy subareas of the image of one visual display 220. Here, the visual display 220 may be supplied with a single pixel-value signal which carries information relating to all of the predefined areas 210 displayed thereon.

Figure 4:
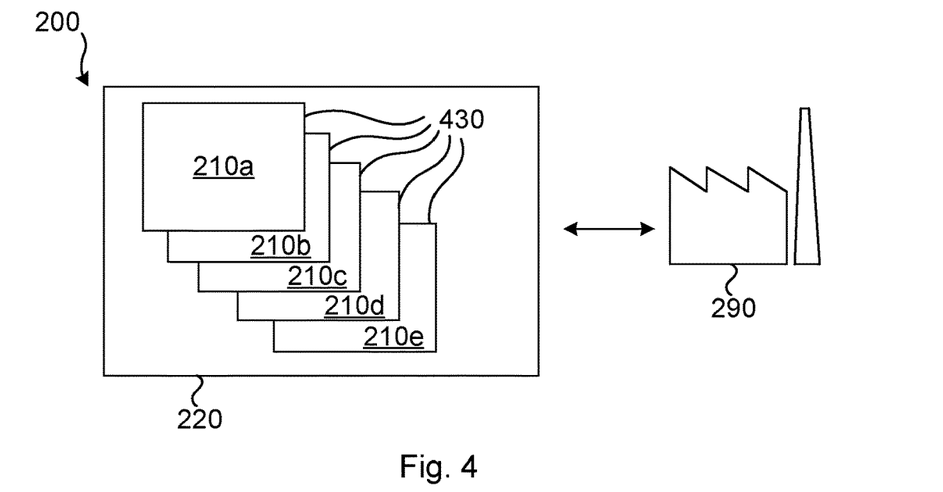

Further alternatively, as shown in FIG. 4, the predefined areas 210 may correspond to different windows 430 of a graphical user interface. The windows 430 are positionable in a mutually concealing arrangement, e.g., one window may be placed in front of (a portion of) another window. Toggling between the windows is normally done by the user, through a key combination or cursor input; the inventor prefers to avoid a forced change to a window with the prioritized area, but the user should rather remain responsible for this toggling, so that she is not exposed unnecessarily to disruptive or sudden stimuli. While the options shown in FIGS. 2 and 3 are primarily applicable to installed visual displays, i.e., devices which are stationary during use in that they are positioned or suspended in a building or control station vehicle, the option according to FIG. 4 would also lend itself to implementation on a handheld device.

Hybrid configurations, in which some areas 210 occupy complete images of respective visual displays 220, while groups of other areas 210 share one visual display 220, are clearly included in the scope of the present disclosure.

The method 100 depicted in FIG. 1 may be implemented by the processing circuitry of the industrial operator interface, or by a device communicatively connected to the processing circuitry.

In a first step 110 of the method 100, it is determined that one of the monitoring areas is to be prioritized. This determination may be made as a result of receiving, e.g., via the communication interface, a signal or message from the technical system 290 or from sensors arranged therein. Alternatively, the determination may be based on polling information from the technical system 290 or a monitoring system associated with the technical system 290.

In a subsequent step 140, an incomplete visibility decrease in at least one other area of the visual operator interface is initiated, wherein the prioritized monitoring area is unaffected by the visibility decrease. The step 140 may include a substep 142 of applying at least one effect. The effect may be chosen as one or more of: blurring an image on said other area, deforming the image (e.g., swirl effect), decreasing a resolution (e.g., pixelated effect, pixelized effect), modifying a text size or font, reshuffling letters or lines of text, freezing the image by suspending updates, reshuffling of subareas of the image (e.g., puzzle effect), positive or negative rescaling, recoloring (e.g., greyscale effect), introducing a partial (e.g., incomplete area-wise, semi-transparent) overlay on top of the image.

Figure 5:
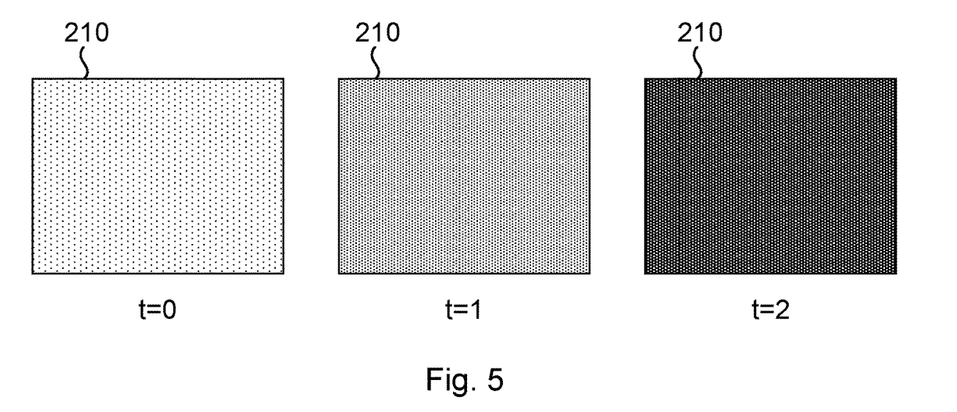
FIGS. 5 and 6 illustrate gradual application of a visibility-decreasing effect to a not-prioritized area of the visual operator interface.
Figure 6:
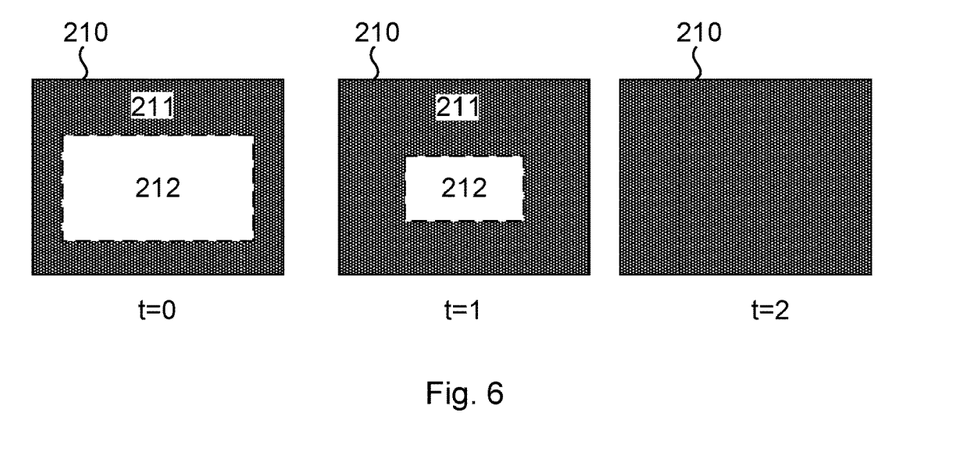

The visibility decrease may be gradual over time. For instance, the intensity of the blurring, pixelation, recoloring etc. may increase from near-zero to complete, as illustrated by the progression at time instances t=0, 1 and 2 (arbitrary units) in FIG. 5, where a darker tone of the area 210 corresponds to a more intense effect. As another option, the visibility-decreasing effect may be applied to a gradually increasing region of the not-prioritized area 210. This is shown in FIG. 6, in which initially (t=0) the effect is applied to a narrow edge portion 211 while a central portion 212 is left unchanged. The edge portion 211 grows inwardly and with time and occupies, at time t=2, the complete area 210.

Optionally, the step 140 further includes a substep 144 of displaying an overlay allowing the operator to distinguish the visibility decrease from a failure of the visual operator interface and/or a runtime error unrelated to the technical system. For example, the overlay may include an animation or may convey real-time information (e.g., current clock time with seconds) to make the visibility decrease distinguishable from an unintentional freezing of the screen.

Figure 8:
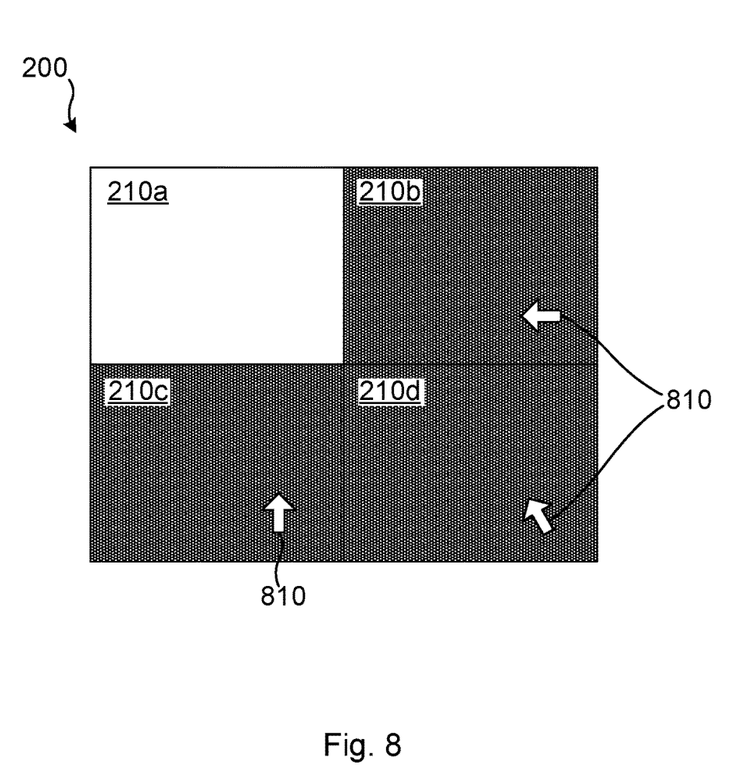
FIG. 8 illustrates visual cues for guiding an operator's attention to the prioritized area of the visual operator interface.

Additionally or alternatively, the step 140 may further include a substep 146 of displaying, in said at least one other area of the visual operator interface, a visual cue (e.g., text or symbols) identifying the prioritized monitoring area. In one embodiment, a graphical element or other visual guidance towards the prioritized monitoring area is displayed. As shown in FIG. 8, the visual guidance may consist of an arrow 810 in each of the not-prioritized areas 210b, 201c, 210d which is substantially aligned with the direction to the prioritized area 210a of the interface 200. If a not-prioritized area 210 is displayed on a handheld device, the method further includes determining a location and/or orientation of said other area relative to the prioritized monitoring area; in general, this depends on the operator's hand position and orientation or the surface where the handheld device is resting. The direction from the handheld device to a stationary display 210 showing other areas 220 of the visual operator interface may be determined by arranging short-range radio emitters on the latter. The visual guidance is generated to reflect to the determined direction. Alternatively, the area on the handheld device may simply advise the operator to look at the stationary display 210, and let her find the prioritized area 220 without particular guidance.

The step 140 of initiating the visibility decrease may be made conditional upon whether the operator's attention is already directed at the prioritized area 210 and/or whether it moves to the prioritized area 210 as desired. Such conditional execution may begin by a step 120 of emitting a visual, audible, haptic etc. notification signifying that a change in attention is necessary. Similar notifications have been used for a long time in existing industrial monitoring systems; this may explain the alarm fatigue experienced by some operators, who tend to disregard such notifications, as discussed initially. It is in decision step 130 that the visual operator interface becomes aware of whether the user has changed her attention as desired. The criterion to be evaluated may be whether the attention of the operator remains outside the prioritized monitoring area for a predetermined first time period after the notification step 120; this criterion may be evaluated in a simplified way by just determining where the operator's attention is directed at the moment the first time period expires. If it is true that the attention is outside the prioritized area (Y branch), the execution of the method 100 enters step 140, whereby the visibility decrease is initiated. If the evaluation does not verify the criterion (N branch), no action is necessary and the method 100 ends.

To implement step 130, the operator's attention may be monitored by gaze tracking (or eye tracking), for which standalone and embeddable devices are commercially available under brands such as Tobii™, Smarteye™ or Hololens™ The gaze tracking hardware may for example be mounted adjacent to a visual display 210 or worn by the operator. For purposes of step 130, it may be sufficient to estimate the gaze direction with a modest accuracy and/or modest spatial resolution; the essential information is which one of the areas 220 of the visual operator interface the operator is looking at. Equivalent means to obtain this information include the following:

- tracking the operator's body attitude relative to the areas of the visual operator interface,
- sensing the operator's proximity relative to the areas 220 of the visual operator interface (e.g., by capacitive sensors mounted adjacent to a visual display 210),
- determining an area 210 where those visual elements which have most recently been actuated by the operator (e.g., by mouse/trackball clicks or other cursor-defined input) are located,
- requesting the operator to actuate a visual element (e.g., a clickable acknowledgement button) in the prioritized monitoring area, provided imperative interaction with the operator is deemed acceptable.

As seen above, decision step 130 achieves a conditional initiation of the visibility decrease 140. As an addition or alternative to this, conditional termination of the visibility decrease can be achieved by subsequent decision step 150. The decision 150 is whether the monitored attention of the operator enters the prioritized monitoring area. Alternatively, the decision 150 is whether the monitored attention of the operator has remained in the prioritized monitoring area for a predetermined second time period. With either criterion, a positive decision (Y branch) triggers the undoing 160 of the visibility decrease. If the outcome of the decision is negative (N branch), the visibility decrease may be maintained and the criterion re-evaluated after a further predetermined (third) time period has elapsed.

Figure 7:
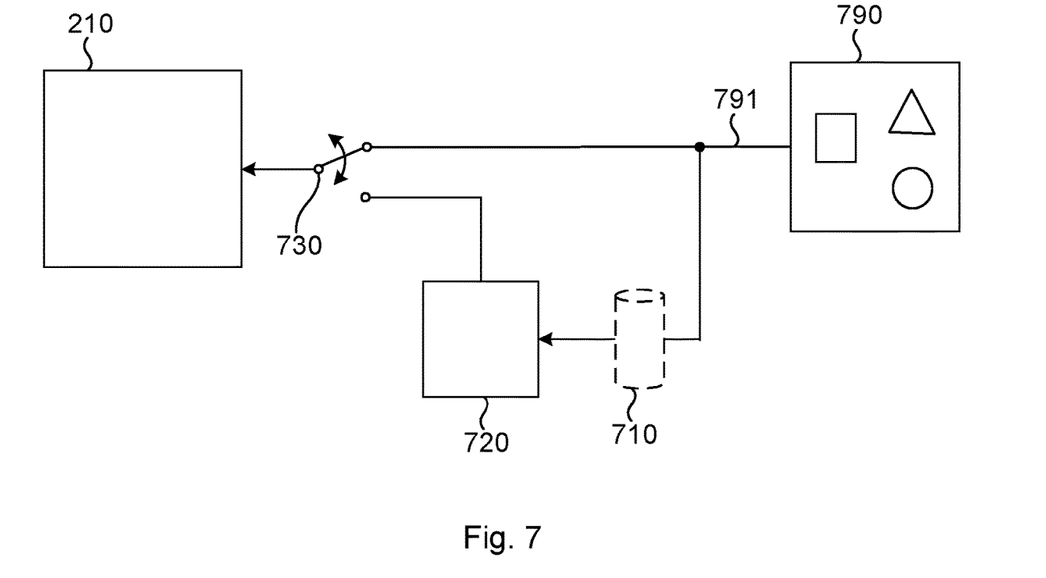
FIG. 7 is a block diagram representing an implementation of a visibility-decreasing effect to be applied to a live stream of images.

FIG. 7 schematically shows a signal-processing architecture that may support an efficient implementation of some embodiments of the invention. An application 790 provides a screen image stream 791 comprising screen images to be displayed sequentially on an area 210 of the visual operator interface. The application 790 may be a technical monitoring application for visualizing the current state of the technical system 290. Alternatively, the application 790 is an unrelated application, such as a messaging application, an Internet browser, an office application or non-professional content. The position of switch 730 corresponds to the normal functioning of this architecture, i.e., at a point in time when no visibility decrease is being applied, so that the screen image stream 791 is forwarded in an unchanged condition to the area 210 along the upper branch. The lower branch is used to supply the area 210 with a visibility-decreased image. It comprises an image processing stage 720 and, upstream of this, an optional cache or memory 710. The image processing stage 720 is operable to receive an image, apply a visibility-decreasing effect and output a processed image, which is supplied to the area 210 when the switch 730 is in the lower position. The lower position of the switch 730 may represent drawing an overlay image on top of the normal image.

The optional memory 710 is configured to temporarily store an image from the stream 791, i.e., metaphorically to take a snapshot of the image stream 791, which is then fed to the image processing stage 720. The snapshot may be generated by means a generic functionality of an operating system, such as 'Print screen'. The processed image, which the processing stage 720 outputs, can be maintained on the area 210 for as long as the visibility decrease is required. In embodiments where no memory 710 is provided, i.e., without the snapshotting, it may be necessary to have the image processing stage 720 process the entirety of the screen image stream 791, which represents a slightly higher computational effort.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling a visual operator interface comprising a plurality of predefined areas, which include one or more monitoring areas configured to display visual elements representing a current state of a technical system, the method comprising:
   determining that one of the monitoring areas is to be prioritized;
   locating an operator's attention in one of the predefined areas; and
   initiating an incomplete visibility decrease in at least one other area of the visual operator interface, wherein the prioritized monitoring area is unaffected by the visibility decrease and the visibility decrease is conditional upon whether the operator's attention is already directed at the prioritized area;
   wherein at least one of the following holds:
   a) the predefined areas of the visual operator interface correspond to one or more of:
      a complete image of an installed visual display,
      a subarea of an image of an installed visual display,
      a visual display of a handheld device;
   b) the predefined areas are juxtaposed as seen from an operator position, in such manner that at least one area extends into the operator's peripheral visual field;
   c) the predefined areas correspond to different windows of a graphical user interface, which are positionable in a mutually concealing arrangement.

2. The method of claim 1, wherein the visibility decrease is achieved by applying at least one effect chosen from: blurring, deforming, decreasing a resolution, modifying a text size or font, freezing, reshuffling of subareas, rescaling, recoloring, introducing a partial overlay.

3. The method of claim 1, wherein:
   the visual operator interface comprises at least three predefined areas; and
   the visibility decrease includes displaying, in at least one other area of the visual operator interface, a visual cue identifying the prioritized monitoring area or visual guidance towards the prioritized monitoring area.

4. The method of claim 3, wherein said other area is a visual display of a handheld device, further comprising:
   determining a location and/or orientation of said other area relative to the prioritized monitoring area, on which basis the visual guidance is generated.

5. The method of claim 1, wherein the visibility decrease is gradual over time.

6. The method of claim 5, wherein the visibility decrease includes one or more of:
gradually increasing an intensity of an effect throughout at least one other area of the visual interface;
applying the effect in a gradually increasing portion of said other area;
applying the effect initially in an edge portion of said other area and gradually extending the edge portion inwardly.

7. The method of claim 1, wherein the visibility decrease includes displaying an overlay allowing the operator to distinguish the visibility decrease from a failure of the visual operator interface and/or a runtime error unrelated to the technical system.

8. The method of claim 1, wherein the visibility decrease is achieved by processing a live stream of screen images addressed to at least one other area of the visual interface.

9. The method of claim 1, wherein the visibility decrease is achieved by obtaining a snapshot of one image in a live stream of screen images addressed to at least one other area of the visual interface, which snapshot is processed and displayed instead of the live stream.

10. The method of claim 9, wherein the live stream of screen images addressed to the at least one other area of the visual interface is unrelated to said technical system.

11. The method of claim 1, wherein said locating the operator's attention is based on one or more of:
tracking operator's gaze,
tracking operator's body attitude relative to the areas of the visual operator interface,
sensing operator's proximity relative to the areas of the visual operator interface,
determining an area where visual elements most recently actuated by operator are located,
requesting the operator to actuate a visual element in the prioritized monitoring area, and
combinations of these.

12. The method of claim 11, further comprising emitting a notification,
wherein the visibility decrease is initiated in response to the monitored attention of the operator remaining outside the prioritized monitoring area for a predetermined first time period from the notification.

13. The method of claim 11, further comprising undoing the visibility decrease when the monitored attention of the operator enters the prioritized monitoring area or when the monitored attention of the operator has remained in the prioritized monitoring area for a predetermined second time period.

14. The method of claim 1, wherein the determination that one of the monitoring areas is to be prioritized is based on a change in the state of the technical system, in particular, on an event, failure, alarm and/or notification.

15. The method of claim 1, further comprising:
locating the operator's attention in one of the predefined areas,
wherein the visibility decrease is conditional upon whether the operator's attention is already directed at the prioritized area.

16. An industrial operator terminal, comprising:
at least one visual display;
a communication interface for receiving information relating to a current state of a technical system; and
processing circuitry configured to:
cause the at least one visual display to generate a visual operator interface including a plurality of predefined areas, which include one or more monitoring areas configured to display visual elements representing a current state of the technical system,
determine that one of the monitoring areas is to be prioritized,
locate an operator's attention in one of the predefined areas, and
initiate an incomplete visibility decrease in at least one other area of the visual operator interface, wherein the prioritized monitoring area is unaffected by the visibility decrease and the visibility decrease is conditional upon whether the operator's attention is already directed at the prioritized area; wherein at least one of the following holds:
a) the predefined areas of the visual operator interface correspond to one or more of:
a complete image of an installed visual display,
a subarea of an image of an installed visual display,
a visual display of a handheld device;
b) the predefined areas are juxtaposed as seen from an operator position, in such manner that at least one area extends into the operator's peripheral visual field;
c) the predefined areas correspond to different windows of a graphical user interface, which are positionable in a mutually concealing arrangement.

17. A computer program comprising instructions stored on a non-transitory data carrier, said instructions configured to control a visual operator interface of an industrial operator terminal, said industrial operator terminal having at least one visual display, a communication interface for receiving information relating to a current state of a technical system, and processing circuitry configured to cause the at least one visual display to generate the visual operator interface including a plurality of predefined areas, which include one or more monitoring areas configured to display visual elements representing a current state of the technical system, wherein said instructions cause the industrial operator terminal to perform a method including the following steps:
determining that one of the monitoring areas is to be prioritized;
locating an operator's attention in one of the predefined areas; and
initiating an incomplete visibility decrease in at least one other area of the visual operator interface, wherein the prioritized monitoring area is unaffected by the visibility decrease and the visibility decrease is conditional upon whether the operator's attention is already directed at the prioritized area;
wherein at least one of the following holds:
a) the predefined areas of the visual operator interface correspond to one or more of:
a complete image of an installed visual display,
a subarea of an image of an installed visual display,
a visual display of a handheld device:
b) the predefined areas are juxtaposed as seen from an operator position, in such manner that at least one area extends into the operator's peripheral visual field;
c) the predefined areas correspond to different windows of a graphical user interface, which are positionable in a mutually concealing arrangement.

* * * * *